US011599719B2

(12) United States Patent
Roberts et al.

(10) Patent No.: US 11,599,719 B2
(45) **Date of Patent: *Mar. 7, 2023**

(54) SYSTEM AND METHOD FOR ELECTRONIC DOCUMENT INTERACTION WITH EXTERNAL RESOURCES

(71) Applicant: DocuSign, Inc., San Francisco, CA (US)

(72) Inventors: Matthew Roberts, Oxford (GB); Daniel Charles Selman, Winchester (GB); Peter Geoffrey Lerato Hunn, Irving, TX (US); Jerome Simeon, New York, NY (US)

(73) Assignee: DocuSign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,898

(22) Filed: Feb. 28, 2022

(65) Prior Publication Data

US 2022/0180053 A1 Jun. 9, 2022

Related U.S. Application Data

(63) Continuation of application No. 16/940,135, filed on Jul. 27, 2020, now Pat. No. 11,314,935.

(Continued)

(51) Int. Cl.

*G06F 3/01* (2006.01)
*G06F 40/186* (2020.01)
*G06F 9/54* (2006.01)

(52) U.S. Cl.

CPC ............ *G06F 40/186* (2020.01); *G06F 9/547* (2013.01)

(58) Field of Classification Search

CPC ...... G06F 40/186; G06F 9/547; G06F 40/174; G06F 40/205

See application file for complete search history.

(56) References Cited

U.S. PATENT DOCUMENTS 5,892,900 A 4/1999 Ginter et al.
6,640,304 B2 10/2003 Ginter et al.

(Continued)

OTHER PUBLICATIONS

Grigg, I. "The Ricardian Contract," Proceedings of the First IEEE International Workshop on Electronic Contracting, Jul. 6, 2004, pp. 1-7.

(Continued)

*Primary Examiner* — Hassan Mrabi

(74) *Attorney, Agent, or Firm* — Fenwick & West LLP

(57) ABSTRACT

A system and method for electronic document management including: creating an executable document object, wherein the executable document object comprises at least one programmable element; constructing an interaction schema object, wherein each interaction schema comprises: executable logic and a trigger as part of an inbound interaction schema or an outbound interaction schema that associates an external resource with the executable document object; and bundling the interaction schema object with the executable document object. The method further includes: in response to triggering an inbound interaction schema trigger: activating the executable logic of the inbound interaction schema, initiating at least one programmable element of the executable document object, and updating the state of the executable document object; and in response to triggering an outbound interaction schema trigger: activating the executable logic of the outbound interaction schema, and modifying the associated external resource with respect to the state of the executable document object.

20 Claims, 14 Drawing Sheets

Related U.S. Application Data

(60) Provisional application No. 62/878,697, filed on Jul. 25, 2019.

(56) References Cited

U.S. PATENT DOCUMENTS

| | | | | |
|---|---|---|---|---|
| 7,433,838 | B2 | 10/2008 | Welsh et al. | |
| 7,546,522 | B2 * | 6/2009 | Tolle | G06F 40/103 715/275 |
| 7,756,772 | B1 | 7/2010 | Konopnicki et al. | |
| 7,831,573 | B2 | 11/2010 | Lillibridge et al. | |
| 8,086,866 | B2 | 12/2011 | Jakobsson | |
| 8,285,681 | B2 | 10/2012 | Prahlad et al. | |
| 9,261,950 | B2 | 2/2016 | Gu et al. | |
| 9,356,965 | B2 | 5/2016 | Kjeldaas | |
| 9,432,192 | B1 | 8/2016 | Pogde et al. | |
| 9,483,455 | B1 | 11/2016 | Bastide et al. | |
| 10,789,461 | B1 * | 9/2020 | Agrawal | G06F 40/221 |
| 2002/0091539 | A1 | 7/2002 | Yin et al. | |
| 2002/0184504 | A1 | 12/2002 | Hughes | |
| 2003/0046639 | A1 * | 3/2003 | Fai | G06Q 10/10 |
| 2004/0267813 | A1 * | 12/2004 | Rivers-Moore | G06F 40/174 |
| 2006/0075323 | A1 * | 4/2006 | Singh | G06F 40/186 715/205 |
| 2007/0250337 | A1 | 10/2007 | Karamchedu et al. | |
| 2009/0234662 | A1 | 9/2009 | Stieber et al. | |
| 2010/0268528 | A1 | 10/2010 | Raskina et al. | |
| 2011/0307278 | A1 | 12/2011 | Clarke et al. | |
| 2012/0303969 | A1 | 11/2012 | Jakobsson | |
| 2013/0031566 | A1 * | 1/2013 | Sureshan | G06Q 10/0633 719/313 |
| 2013/0218980 | A1 * | 8/2013 | Vins | G06Q 10/10 709/206 |
| 2014/0006962 | A1 * | 1/2014 | Gu | G06F 9/451 715/738 |
| 2014/0164255 | A1 | 6/2014 | Daly et al. | |
| 2015/0379510 | A1 | 12/2015 | Smith | |
| 2016/0028552 | A1 | 1/2016 | Spanos et al. | |
| 2016/0034519 | A1 | 2/2016 | Besch et al. | |
| 2016/0110261 | A1 | 4/2016 | Parab et al. | |
| 2016/0117471 | A1 | 4/2016 | Belt et al. | |
| 2016/0266864 | A1 * | 9/2016 | Rajendran | H04L 12/1822 |
| 2016/0283941 | A1 | 9/2016 | Andrade | |
| 2017/0103167 | A1 | 4/2017 | Shah | |
| 2017/0103468 | A1 | 4/2017 | Orsini et al. | |
| 2017/0236120 | A1 | 8/2017 | Herlihy et al. | |
| 2017/0287090 | A1 | 10/2017 | Hunn et al. | |
| 2017/0331896 | A1 | 11/2017 | Holloway et al. | |
| 2018/0005186 | A1 | 1/2018 | Hunn | |
| 2018/0174255 | A1 | 6/2018 | Hunn et al. | |
| 2018/0315141 | A1 | 11/2018 | Hunn et al. | |
| 2018/0365201 | A1 | 12/2018 | Hunn et al. | |
| 2019/0080392 | A1 | 3/2019 | Youb et al. | |
| 2019/0122317 | A1 | 4/2019 | Hunn et al. | |
| 2019/0303139 | A1 * | 10/2019 | Pechacek | G06F 3/04817 |
| 2019/0358515 | A1 | 11/2019 | Tran et al. | |
| 2020/0057994 | A1 | 2/2020 | Hunn | |
| 2020/0104296 | A1 | 4/2020 | Hunn et al. | |
| 2020/0143115 | A1 * | 5/2020 | Brigham | G06N 3/006 |
| 2020/0201913 | A1 * | 6/2020 | Terry | G06Q 30/0281 |
| 2020/0357084 | A1 * | 11/2020 | Lerato Hunn | H04L 9/32 |

OTHER PUBLICATIONS

White, R. "Part 1: Boot-Up Process." Chapter 5, How Computers Work, Que Publishing, 7th edition, Oct. 15, 2003, pp. 4-9.

United States Office Action, U.S. Appl. No. 16/940,135, dated Jul. 6, 2021, 17 pages.

* cited by examiner

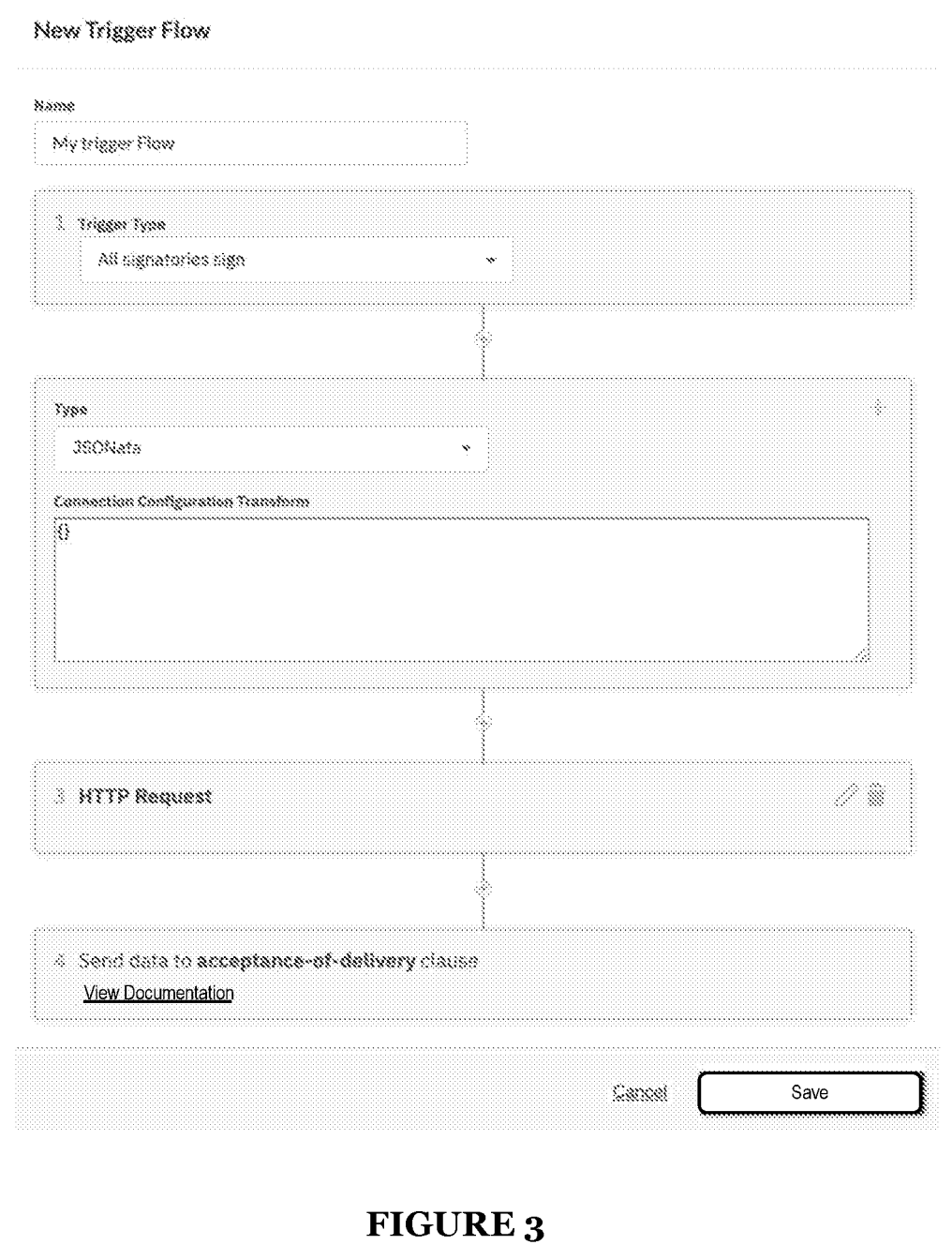

New Trigger Flow

Name

My trigger Flow

1 Trigger Type

All signatories sign

Type

JSONata

Connection Configuration Transform

{}

3 HTTP Request

4 Send data to acceptance-of-delivery clause

View Documentation

Cancel Save

FIGURE 3

SYSTEM AND METHOD FOR ELECTRONIC DOCUMENT INTERACTION WITH EXTERNAL RESOURCES

CROSS-REFERENCE TO RELATED APPLICATIONS

This application is a continuation of U.S. application Ser. No. 16/940,135, filed Jul. 27, 2020, now U.S. Pat. No. 11,314,935, which application claims the benefit of U.S. Provisional Application No. 62/878,697, filed on Jul. 25, 2019, all of which are incorporated in their entirety by this reference.

TECHNICAL FIELD

This invention relates generally to the field of electronic document processing, and more specifically to a new and useful system and method for electronic document interaction with external resources.

BACKGROUND

Electronic documents (or 'smart' documents, or data-driven documents) are computer-managed resources that may have additional functionality beyond plain text. This enables the creation of new types of documents with many added functionalities. Examples of documents may include: automated organization documents, contracts with enforcement capabilities, transaction documents, policy documents, planning documents, authentication and authorization documents, etc.

With more complex functionality, there is a greater need for electronic documents to connect and interact with external resources to accomplish certain desired tasks. Connecting, or exposing a document to external systems to draw in data from external resources or to perform actions and operations on these external resources while ensuring that there is a valid system of record of these operations is an impediment to the adoption and use of electronic documents. Typically, all external interactions must be taken into account upon creation of an electronic document such that the document has the ability to interact with external resources. Having to consider external resources during the creation of an electronic document thus creates a burdensome labor overhead for implementation of electronic documents (e.g. electronic contracts). This may create a barrier to creating, customizing, and/or using such electronic documents.

Thus, there is a need in the field of electronic document management to create a new and useful system and method for configuring the formation, execution, and management of executable documents, for efficient implementation of interactions with external resources. This invention provides such a new and useful system and method.

BRIEF DESCRIPTION OF HE FIGURES

FIG. 2-4 are exemplary screenshots of a user interface;

DESCRIPTION OF THE EMBODIMENTS

Figure 1:
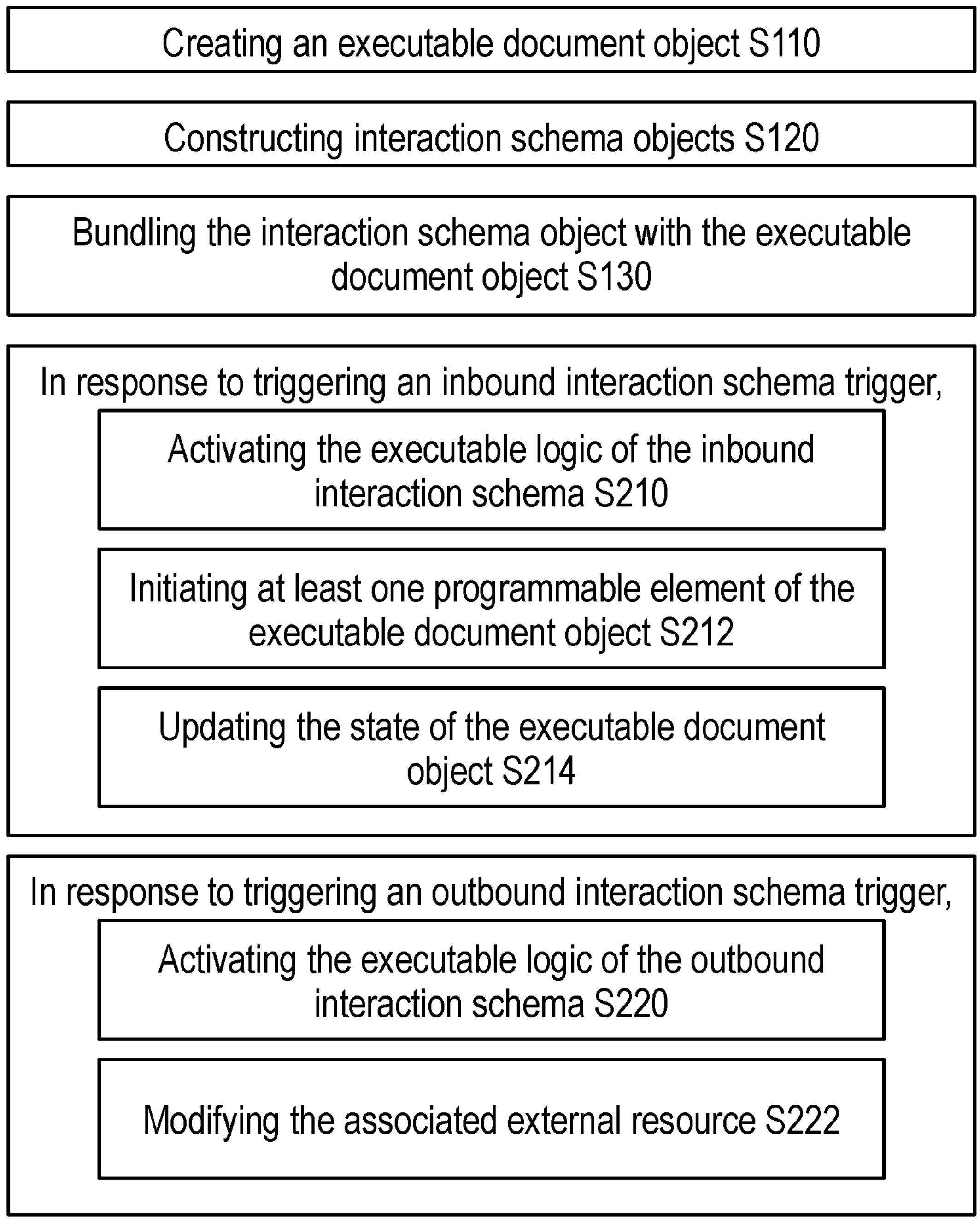
FIG. 1 is a flowchart representation of a method of a preferred embodiment.

The following description of the embodiments of the invention is not intended to limit the invention to these embodiments but rather to enable a person skilled in the art to make and use this invention.

1. Overview

A system and method for executable electronic document management of one embodiment can include: creating, managing, and executing electronic documents as part of a document package, wherein the document package includes the electronic document and interaction schemas that configure and manage connections to external application programming interfaces (APIs). The interaction schemas can include executable logic that define and control the interactions between the electronic document and the external resources. The system and method preferably implement technical solutions to constructing and using interaction schemas with an electronic document. These interaction schemas may be constructed de novo for each implementation. In some variations, the system and method may include a template library, wherein interaction schemas associated with specific external resources may be stored as interaction schema templates. Interaction schemas may then be generated and instantiated with all necessary user and external resource assets into the document package.

As part of a platform for creating, managing, bundling, and executing electronic documents, the system and method may comprise: a document management system, used to create, edit, and remove document package components; a repository system, that stores electronic documents and all associated components; a templating system, for creation and implementation of document and interaction schema templates; and an execution engine, that compiles and executes the electronic document and associated components.

The system and method function to enable the use and processing of external data with and through the electronic document. Via inbound interaction schemas, the system and method enables the electronic document to be configured to utilize data from resources external to the document (e.g. process data from external resources, perform computations using data from one or more resource(s), or respond to events by updating and/or utilizing the state of the electronic document). Via outbound interaction schemas, the system and method enables the electronic document to perform actions on or within resources external to the document (e.g. record/update copies of the document, process calculations external to the document, or perform transactions).

The system and method may be implemented as a private, or local network, document platform, wherein one user, or multiple users, may manage and execute documents locally that access local and remote APIs. Alternatively, the system and method may be implemented as a service, wherein users may "log in" to access tools and templates for electronic document management. This service may be as part of a regularly updated software, cloud service, or similar implementation.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method enables use of templates to create electronic documents. This may enable a user with little to no programming skill to create an electronic document with complex functionalities, including, but not limited to, workflows and business processes.

Generally, a user needs to know the appropriate protocols to utilize an API. With templates and instantiated interaction schemas, a user may have full accessibility to a desired API with no or little knowledge of appropriate protocols.

As another potential benefit, the system and method may enable quick additions of API interactions through simple configuration and 'drag-and-drop' tools.

As part of a management platform, the system and method may enable a user to access multiple APIs using a single login. By logging into the platform, interaction behind containing all necessary assets may access desired APIs.

Additionally, as part of the management platform, the system and method may enable association of multiple APIs to single, or multiple documents, as part of a complex workflow.

2. Method

As shown in FIG. 1, a method for executable electronic document management includes: creating an executable document object S110, wherein the executable document object comprises executable programmable elements and optionally natural language elements; constructing an interaction schema object S120, wherein each interaction schema comprises: executable logic and a trigger component as part of an inbound interaction schema or an outbound interaction schema that associates an external resource with the executable document object; and bundling the interaction schema object with the executable document object. Creating an executable document object S110 may include: setting executable programmable elements within the executable document object; integrating natural language elements with the programmable elements S114; and establishing a state for the programmable elements S116, thereby making the programmable elements executable. Constructing an interaction schema object S120 may include: associating an external resource with the executable document object S122, generating an executable logic for the interaction schema object from a interaction schema template S124, setting a trigger type for the trigger S126, and instantiating the executable logic of the interaction schema object S128. The method functions to create and package an executable electronic document such that external resources may be leveraged for execution of the electronic document (or the electronic document may be leveraged for an action on, or by, external resources). Thus, the method further includes: in response to triggering an inbound interaction schema trigger: activating the executable logic of the inbound interaction schema S210, initiating at least one programmable element of the executable document object S212, and updating the state of the executable document object S214; and in response to triggering an outbound interaction schema trigger: activating the executable logic of the outbound interaction schema S220, and modifying the associated external resource with respect to the state of the executable document object S222.

As a method for executable electronic document management, the method may be implemented in numerous preferred variations, wherein the method may comprise just a single or multiple aforementioned steps or sub-steps, multiple iterations of any steps or sub-steps, and/or in conjunction with additional desired steps. For example, in some variations, the method further includes building an executable document object template and/or creating a interaction schema template, wherein the object template and interaction schema template may function as precursor building blocks for creating an executable document object S110 and constructing interaction schema objects S120.

As a first example implementation, the method may function as part of a single user management platform, wherein the user may implement all aforementioned steps for electronic document management. The user may additionally acquire templates from an internal library of templates, an external source (e.g. as part of a software purchase), and/or create new templates.

In a second example, the method may be implemented as part of a multi-user management platform. In this example, user-created executable document objects may be previously implemented, wherein a new user may then instantiate the executable document objects as desired. The multi-user management platform can support users to create multiple electronic documents. In some cases, components (e.g., interaction schemas) may be shared across different instances of an electronic document. In one example for a contract electronic document, multiple contract participants may each have a "copy" of the document on the same management platform. These copies may then receive status updates from an inbound interaction schema associated with external API (e.g. a web-trading platform).

In a third example, the method may be provided as a service, e.g. as part of a 'pay-to use' management platform. In this example, external resources may be already identified. Thus, common external resource associations may already be implemented. Additionally, bundling of commonly used interaction schemas with specific executable document objects may be previously implemented at a template level, such that a user may create an executable document object S110 and construct an interaction schema object S120 simultaneously.

In a fourth example, the method may be implemented as part of an electronic contract management platform. In this example, executable document objects may function as electronically executable contracts, wherein execution of programmable elements would comprise execution of contract programmable elements, and natural language elements may, or may not, comprise legally binding contract language. Furthermore, external resources may additionally comprise contract participant resources.

Figure 2:
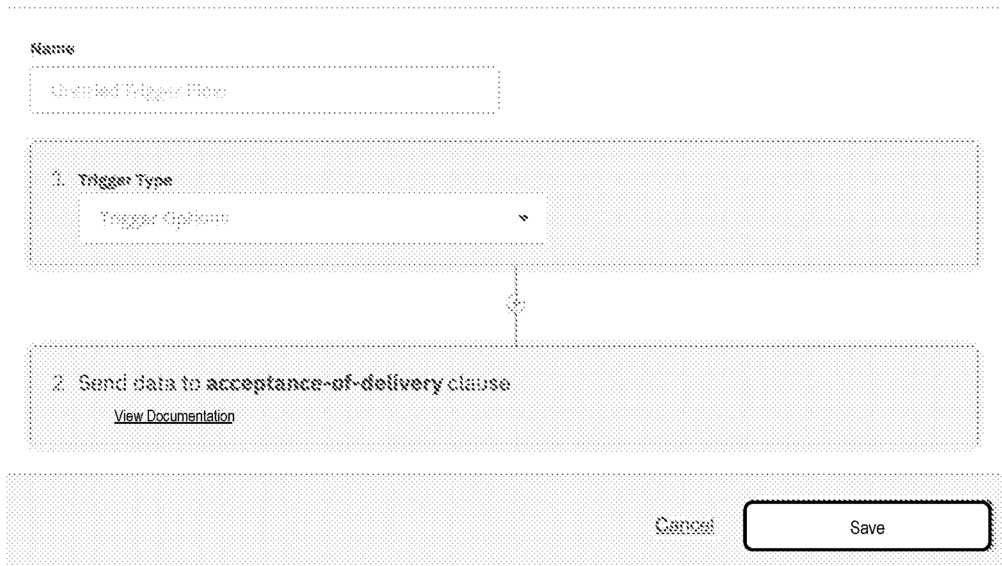
Figure 4:
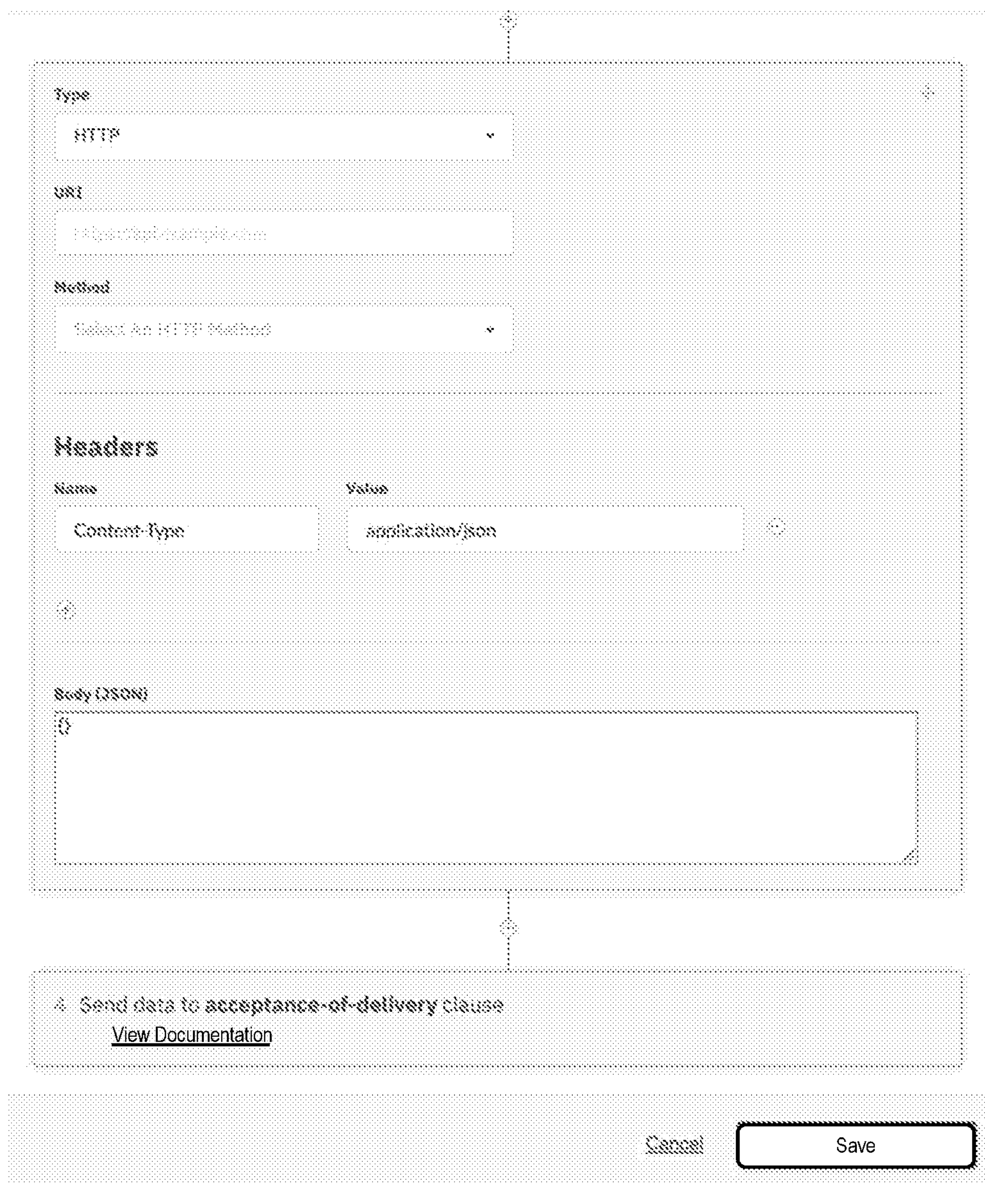

As part of variations wherein the method is provided as part of a management platform, the method may be implemented in conjunction with template libraries. In these variations, executable document objects and executable document object components, in addition to interaction schema objects and interaction schema object components, may be obtained from these template libraries and then configured for a desired implementation. In some implementations, methods that include template libraries may further include steps to build the template libraries; i.e. building a document template library and building an interaction schema template library. Alternatively, template libraries may be obtained from outside of the method, or developed through existing method steps. Steps to obtain and configure document and interaction schema, components may be performed over a user interface (UI), as shown in FIGS. 2, 3 and 4, but may be accessed through other means (e.g. command line, an). As an alternative to creating objects and components from scratch, template libraries may include predefined components dependent on the template context. Additionally, as part of a template implementation, users may be enabled to create new templates or modify existing templates, by creating, removing, or modifying executable and non-executable components of a given template, interaction schema objects, and document objects.

Figure 5:
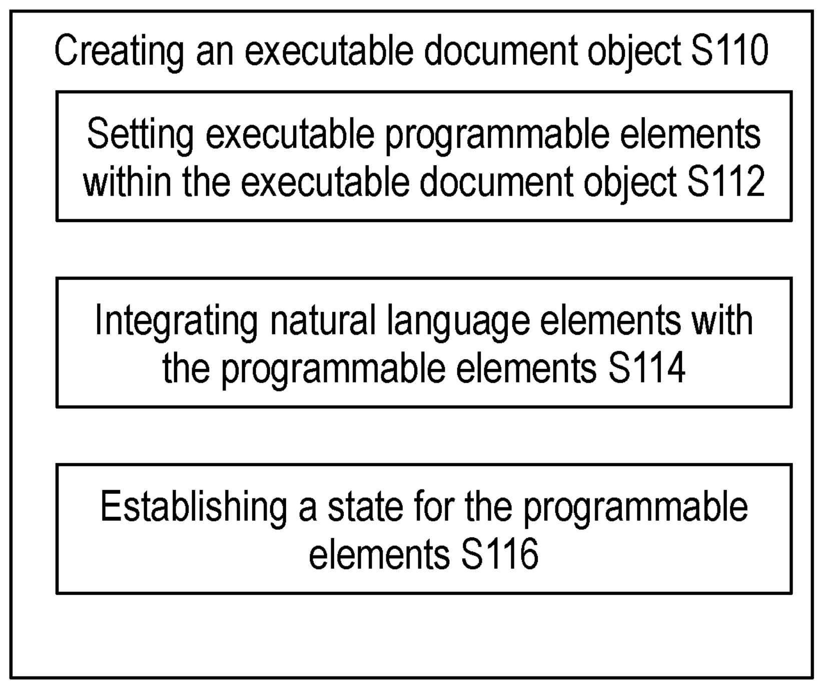
FIG. 5 is a flowchart representation of one variation of method sub-steps.

Block S110, which includes creating an executable document object, functions to create, configure, and store an executable document object with a computer-implemented system. That is to say, creating an executable document object configures executable components of the document object, integrates non-executable components appropriately within the document object, and stores the document object (e.g. on a cloud storage serve, mainframe, database, execution platform, etc.) such that the executable document object will or can be executed. As shown in FIG. 5, in some variations, creating an executable document object may comprise setting executable programmable elements within the executable document object S112, integrating natural language elements with the programmable elements S114, and establishing a state for the programmable elements S116.

Dependent on implementation, creating an executable document object S110 may occur in several different ways. In one variation, creating an executable document object may occur by receiving data definition of the executable document object and its components and thereby creating the executable document object and all of its subcomponents. For example, an edited data file with defined code and natural language may be received as part of the document object). In another variation, creating an executable document object may be created and put together on a UI, wherein components may be stored, added, removed, or modified through the UI. This variation may be implemented with a template library, wherein library components may be added and modified as part of creating an executable document object S110. Dependent on implementation, creating an executable document object S110 may include performing all sub-steps on a single platform (e.g. management platform), but may alternatively include performing some, or all, sub-steps on distinct platforms (e.g. programmable elements may be added through a UI after a natural language document created externally is imported onto the platform). When performing on different computing platforms, the method may include communicating and coordinating the creation of the executable document object.

The executable document object may be any type of general, or specific, electronic document with executable components. Examples may include: electronic contracts, executable spreadsheets, markup texts, dynamic reporting documents, and the like. An executable document object may comprise executable programmable elements and may include natural language elements.

An executable document object preferably includes at least one programmable element. Alternatively, the executable document object may not include any programmable elements. Programmable elements function as the dynamic programmable logic-based executable components, embedded within the executable document object. Programmable elements may comprise simple, or complex, functionalities; and thus for practical reasons may differ in size from a single line representation of code to thousands of lines of code. For example, one programmable element may update the value of a variable by copying the value from a source; a second programmable element may comprise a media player, and a third programmable element may implement dynamic simulations based on information within the document object. Programmable elements may call, or interact, with other programmable elements as desired dependent on implementation.

Execution of the document object may refer to execution of any number of programmable element(s) within the document object. That is, execution of the document object may entail synchronous execution of one, or more, programmable elements within the document object; and/or execution of one, or more, asynchronous programmable elements within the document object.

Executable document objects can include natural language elements. Alternatively, an executable document object may not include natural language elements. Natural language elements may function as "text" of the document object. As used herein, natural language elements may refer generally to any non-executable element within the document object. For example, natural language may be in English, or any other written language, but may alternatively be in a coded language, encrypted form, machine language, or any other alternative form of "natural language" that can convey information. Additionally, natural language elements may include rich media content, such as images, video, audio elements, charts, figures, and/or other non-executable elements.

Creating an executable document object S110 may include setting executable programmable elements within the executable document object. This may entail generating new programmable elements (e.g. creating source code) and/or extracting programmable elements from a source. Setting executable programmable elements functions to provide the executable logic for the executable document object. In variations that include a template library, the setting executable programmable elements may include extracting programmable elements from a document template. Setting executable programmable elements may include incorporating single programmable elements, or sets of programmable elements.

Extracting programmable elements from a document template may include choosing a desired document template, and then choosing the desired programmable element(s) included (or linked) to the document object to be extracted.

In some variations, setting programmable elements may comprise some combination of generating new programmable elements and extracting programmable elements from a source. In a template library example, setting programmable elements may comprise: generating a programmable element and associating the programmable element with a document template. Generating the programmable element and associating the programmable element may be steps taken by a user. As part of a service implementation of the method, generating a programmable element and associating the programmable element with a document template may be actions taken by a vendor providing the service; and a user/customer may then extract programmable elements from the document template as desired.

In some variations, setting programmable elements may occur through a graphical user interface (GUI). In these variations, a user may 'drag-and-drop' a preconfigured programmable element into the document object from a library of programmable elements. The library of programmable elements may comprise a limited list of programmable elements within a specific document template, or may comprise an expanded list of all library programmable elements. After setting the programmable elements, the programmable elements may then be modified (e.g. added removed or edited). In some variations, adding these programmable elements may generate code within the document. A user may then edit this code either manually, by modifying the code, through menu-driven options of the user interface, or through a command line interface.

Creating an executable document object S110 may include integrating natural language elements with the programmable elements. Integrating natural language elements may function to provide "readability" to the executable document object. Integration may include creating and storing a document object that has interspersed programmable and natural language elements. This integration may take any desired form. In one example, integrating natural language elements may create a markup document. In a second example, integrating natural language may create a JSON file. The type of integration and document object created may depend on desired implementation.

In variations, wherein the natural language is pre-generated, (e.g. previously included in a template document) integrating natural language may enable a user to edit the natural language. This may generally include editing the integrated document object text, but dependent on the type of natural language this may include adding or removing certain natural language elements (e.g. adding a video file).

In variations that include a template library, integrating natural language elements may include setting natural language elements from the library. In some implementations, natural language elements may be "pre"-integrated with programmable elements in a document template. In these variations, setting programmable elements and integrating natural language elements may comprise simultaneous or concurrent actions. Analogous to the addition of programmable elements, natural language elements may also be taken from a document template. As part of a GUI, natural language elements may be added, removed, moved, and/or modified as desired.

Creating an executable document object S110 preferably includes establishing a state for the programmable elements. Establishing a state for the programmable elements functions to enable the execution of the programmable elements, and thus also the execution of the executable document object. In some variations, establishing a state comprises setting the state of some and/or all the independent variables of each programmable element. This may be performed in response to received user input or machine/system input other form of input. Alternatively, some and/or all variables may have external associations such that they may be set through other means. In variations that include a GUI, establishing a state for the programmable elements may occur through a menu-driven process wherein lists of available parameters may be provided for the user to choose from. In some variations, the executable document object and/or programmable elements may have a static state (also referred to as "stateless"). In these variations, no state is generated and/or stored for the document object. Establishing a state for the programmable elements of a stateless executable document may thus enable execution of the document without altering the state, or requiring storage of the state, of programmable elements and document objects.

Figure 6:
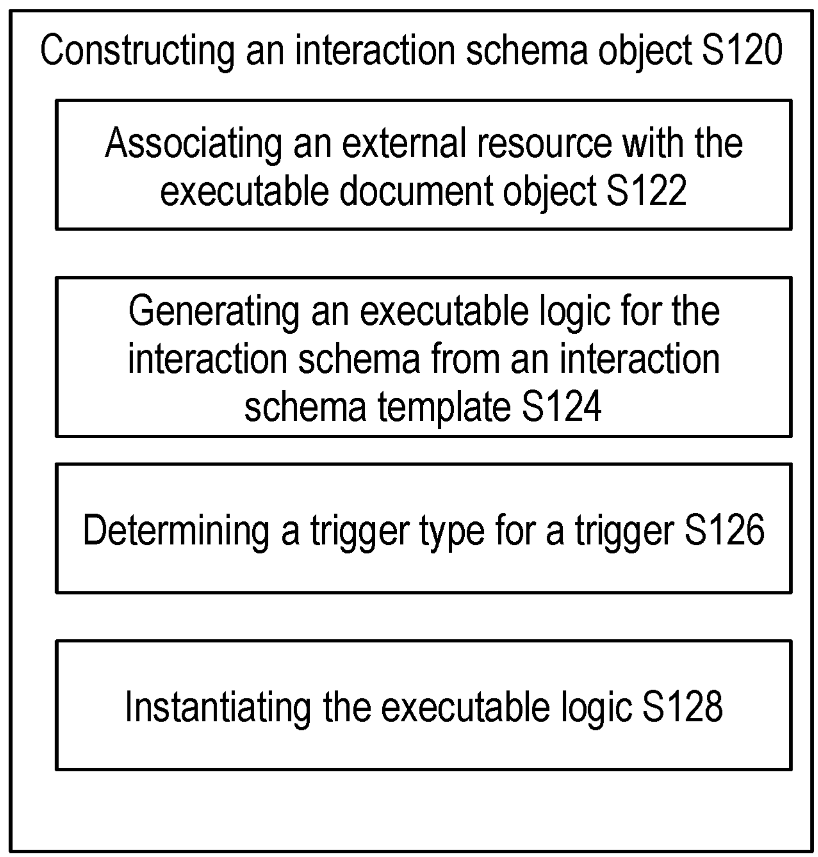
FIG. 6 is a flowchart representation of one variation of method sub-steps.

Block S120, which includes constructing an interaction schema object, functions to create a data resource object establishing logic flows that define and control interactions between the document object and external resources, thus setting up an external resource integration for an interaction schema object. Constructing an interaction schema object may involve defining the steps in an interaction schema for processing input to or output from a programmable element. An interaction schema preferably configures and manages integration through an API such as an API for services such as, but not limited to, cloud services (e.g. Google Cloud), a payment gateway (e.g. Stripe), a secure private server, a blockchain or distributed ledger system (e.g. an Ethereum-based blockchain), a network-connected device (e.g. via an IoT platform API) and/or other APIs. An interaction schema object may be constructed for each external resource interaction. Alternatively, multiple interaction schema objects may be constructed for each external source interaction. As shown in FIG. 6, in some variations that include a template library, constructing an interaction schema object S120 may comprise associating an external resource with the executable document object S122, generating an executable logic for the interaction schema from an interaction schema template S124, determining a trigger type for a trigger S126, and instantiating the executable logic of the interaction schema S128.

The interaction schema preferably associates an external resource with the executable document object. The external resource may comprise any resource external to the document object and/or the platform that manages the document object. That is, dependent on the implementation, the external resource may be on or off the management platform, locally or externally controlled and/or managed. The external resource may be directly connected (e.g. hard-wired) to the document management platform, or may be indirectly connected (e.g. over the internet). Dependent on the implementation external resources may be any private or public resource. Examples of external resources include: a blockchain, a distributed ledger, a private server, an API service (e.g., Stripe, Slack, etc.), repositories (e.g. Amazon S3, GitHub, etc.), files (e.g. CSV files and lookup tables), an application, network-connected device, a locally managed or cloud-based e-signature service, an audit log, local timer, local network notification system and/or any other type of external resource.

Each interaction schema object comprises executable logic and a trigger, wherein activation of the trigger executes the executable logic. The interaction schema may comprise an inbound interaction schema (logic flow from an external resource to the document object), or an outbound interaction schema (logic flow from the document object to the external resource). Alternatively, an interaction schema may comprise both an inbound interaction schema and an outbound interaction schema. The executable logic may be of any arbitrary complexity and comprise any number of steps as desired. The method may additionally include constructing multiple inbound and/or outbound interaction schemas, which are then associated with an executable document object. Similarly, one interaction schema may be associated with multiple executable document objects.

Constructing an interaction schema object S120 preferably includes associating an external resource with the executable document object. In some variations, a single external resource is associated with each interaction schema object; alternatively multiple external resources may be associated with a single interaction schema. Associating an external resource with the executable object functions to setup the framework such that user-provided information may enable interaction between the external resource and document object. The method steps of associating an external resource may be unique to the specific external resource (e.g. many APIs have different security and connection protocols which must be used for interaction with that API). Associating an external resource may thus include providing authentication details specific for the external resource. In some variations that include a template library, the template library may include external resource-specific interaction schema templates, wherein user-specific association details may be added through a UI, command line interface (CLI) or other interface.

Constructing an interaction schema object S120 preferably includes generating an executable logic. The executable logic may function to define business logic of the document object and/or the interaction between the document object and an external resource. Generating the executable logic may be dependent on implementation and the associated external resource. In some variations, wherein the external resource provides integration tools, generating the executable logic may comprise obtaining the executable logic from the external resource (or other third party). In variations that include a template library, generating an executable logic may comprise generating the executable logic from the interaction schema template for the desired API. Alternatively, generating an executable logic may comprise creating the executable logic (e.g. coding). In these variations, the executable logic may be added to the template library for future use as part of an interaction schema template.

The executable logic functionality may be dependent on the direction of the interaction schema, the associated external resource, and the type of interaction between the document object and the external resource. Typical outbound interaction schema functionality includes actions on or by the external resource. For example, for an outbound interaction schema, the executable logic to a payment gateway account may call for the payment gateway account (e.g. a Stripe account) to make payment. In a second example, the executable logic to a blockchain may call for storage of the document object or part thereof (e.g. a document object state) on the blockchain. Other examples of outbound interaction schemas may include, but are not limited to: sending a notification or message on an instant message platform (e.g. Slack) or via an email delivery service (e.g. SendGrid), generating an invoice on an accounting application, triggering a workflow on a robotic process automation (RPA) service, and triggering the logic of a blockchain or distributed ledger-based smart contract.

Executable logic for inbound interaction schemas typically reports events. These events may then subsequently lead to execution of programmable elements of the document object. In one example of an inbound interaction schema, the executable logic from an e-signature service may indicate to the document object that all signatories have signed. In a second example, the executable logic from an information service (e.g. weather service, stock price service) may relay updated information to the document object. Other examples of inbound interaction schemas include: confirmation that a payment was made via a payment gateway, a delivery was recorded via a freight or courier service, a data 'oracle' service, and/or other examples. Other examples may include services established specifically for the provision of data to the document object such as a timer, custom middleware, application, or API.

The interaction schema preferably includes a trigger, wherein the activation of the trigger may function to initiate the executable logic of the interaction schema. Constructing an interaction schema object S120 may include setting a trigger type for the trigger, wherein the trigger type functions to set how a trigger is activated. Trigger types may be dependent on the interaction schema direction (e.g. inbound interaction schema or outbound interaction schema), wherein other trigger types may be independent of the interaction schema direction. A trigger type may be an event, operation, action, process, transaction, or any similar type of occurrence that can happen on, or within, a document management system, an external service, an application, a system, on a blockchain/distributed ledger, an API, or other platform. One example of an independent trigger type is a time-based trigger (e.g. a trigger that activates at a specific time or at intervals). An outbound interaction schema trigger type may be an action trigger, such that once a specific document object action occurs (e.g. a programmable element execution), the interaction schema is activated. An inbound interaction schema trigger type may be an event trigger (e.g. webhook), wherein the interaction schema monitors for a specific external event to activate. In some variations, the trigger is a Boolean which either does, or does not, initiate execution of the executable logic. Alternatively, the trigger may be graded, such that it is dependent on 'how' the trigger is activated, execution of the executable logic may differ.

Constructing an interaction schema object S120 may include instantiating the executable logic of the interaction schema. Instantiating the executable logic of the interaction schema functions to enable operation of the interaction schema object. Instantiating the executable logic may include adding or linking necessary information such that executable logic may successfully function with regards to the document object and the associated external resource. In many variations, instantiating the executable logic may include adding/linking necessary credentials (e.g., security login, authentication tokens, shared secrets, etc.) to enable a user, account, or entity to connect to the external resource. The type of added/linked information may be unique to the user, to the potential interaction schema activity, and/or to the external resource(s).

In some variations, instantiating the executable logic of the interaction schema object may include user interaction(s) received through a user interface, wherein the user is required to provide access or other credentials for the external resource. Dependent on implementation, the credentials may be requested in every interaction, or may be stored for automated access. For example, the executable logic that is used to broadcast messages over Slack may include the user login information to connect to a Slack account. This login information may be obtained during an initial instantiation of the executable logic. For variations that include a management platform with a template library, a user may initially provide security and access information as part of a profile on the platform. As part of choosing an interaction schema template with association to a specific external resource, the required user information may be directly instantiated in the executable logic.

Block S130, which includes bundling the interaction schema object with the executable document object, functions to configure and store the executable document object and all interaction schemas associated with the executable document object. In some variations, bundling creates and stores the interaction schemas and the document object as a single file. Alternatively, they may be stored as multiple files.

Figure 7:
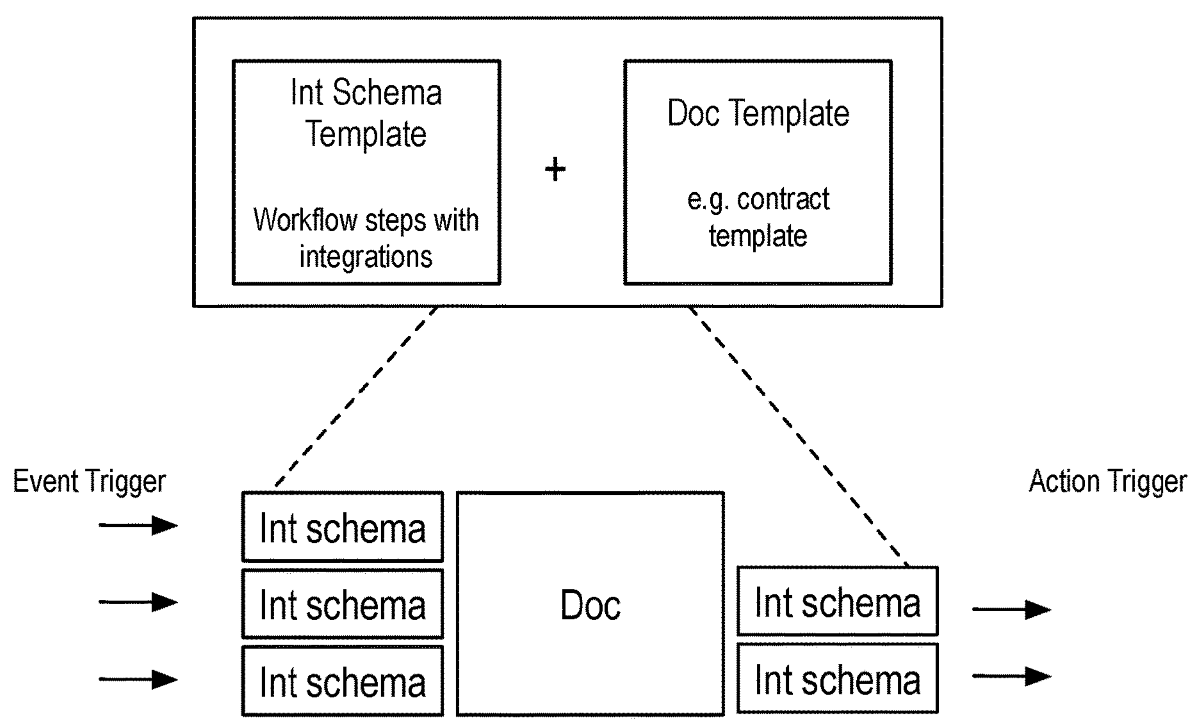
FIG. 7 is a schematic of electronic document bundling.

As shown in FIG. 7, in some variations that include a template library, bundling may occur prior to creating an executable document object S110 and constructing an interaction schema object S120. In these variations, block S130 may comprise bundling a document template with one or more interaction schema templates. In these variations, creating an executable document object would then entail creating an executable document object already bundled to a set of interaction schemas. Although potentially any interaction schema template may be bundled with a document template, bundling at the template level may enable efficient packaging and utilization of interaction schema objects that are commonly used with a particular document object type. That is, a document template may be bundled with any number of interaction schema templates that are typically used together. In this manner, interaction schema templates may be added, removed, or modified from any document template bundle. In some implementations of bundled templates, once a user has chosen a document template, a user may then (e.g. through a UI or CLI) choose and set up interaction schemas that have their associated interaction schema template bundled with the document template. As part of the user profile implementation, a user may then choose a bundled template package dependent on a desired executable document object, and add/remove/modify interaction schema templates associated with desired external resources; wherein the user profile information may be used to automatically instantiate the necessary interaction schema objects. A document template bundle may be configured and stored for reuse for a given instance of a document type. A document template bundle may be stored in a library or repository for ease of reuse and deployment.

Figure 8:
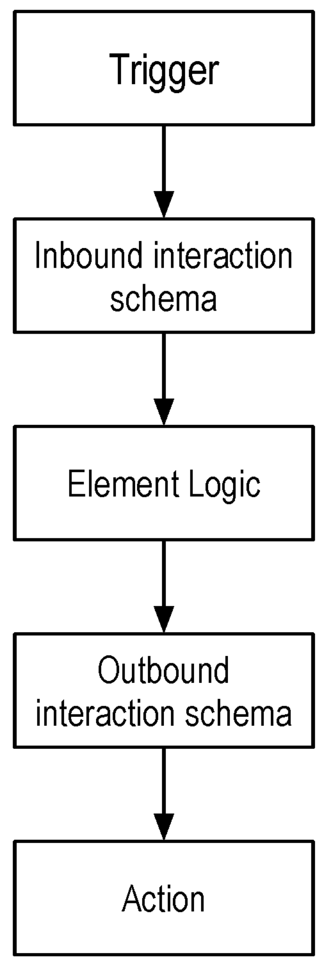
FIG. 8 is a flowchart representation of data flow.

As part of a method for executable electronic document management, the method may further include executable document actions, wherein these actions may be in response to external events and/or in response to actions of the executable document object. As shown in the flowchart representation of FIG. 8, one variation of responses may be seen as a response to an external trigger leading to an inbound interaction schema to the element logic (e.g. a programmable element) of the document object, which may then trigger an outbound interaction schema leading to an action on, or within, some associated external resource and/or the executable logic of the document object or interaction schema object(s).

The method may include, in response to triggering an inbound interaction schema trigger: activating the executable logic of the inbound interaction schema, initiating at least one programmable element of the executable document object, and updating the state of the executable document object. The inbound interaction schema response functions to initiate execution of at least one programmable element within the document object, update the state of the document object via the inbound interaction schema. In some implementations and situations, execution may comprise execution of the document object. Inbound interaction schema trigger types may generally be any type of trigger type. In some variations inbound interaction schema trigger types are event trigger types (e.g. webhook), wherein the associated external resource is monitoring for a specific event to initiate the trigger.

Block S210, which includes activating the executable logic of the inbound interaction schema, functions in activating the inbound workflow to the document object, in response to the trigger.

Block S212, which includes initiating at least one programmable element of the executable document object, functions in executing at least one programmable element of the document object. The programmable element(s) execution may be dependent on the inbound interaction schema. For example, an inbound interaction schema containing weather information for a weather interaction document object may execute programmable elements that include temperature-dependent variables. In another example, an inbound interaction schema from an e-signature external resource to a contract document object may initiate the execution of the contract document object (e.g. when all contract signatories have signed). In a third example, an inbound interaction schema from a payment gateway service containing a sale confirmation to a sales document object may initiate a to close the sale. In a fourth example, an inbound interaction schema from an identity or credential verification service containing identity verification data (e.g. an access token or other data) may trigger executable logic within the document object or within another integrated resource such configuring an e-signature “surface area” or other functionality instantiated into the document via one or more interaction schema steps. Doing so may enable configuration of the e-signature service based upon the response from the credentialing resource. In a discrete example, the e-signature of the document may be conditioned via the executable logic of the document object and/or associated interaction schemas to condition signature functionality using the data returned from the credentialing service.

Figure 13:
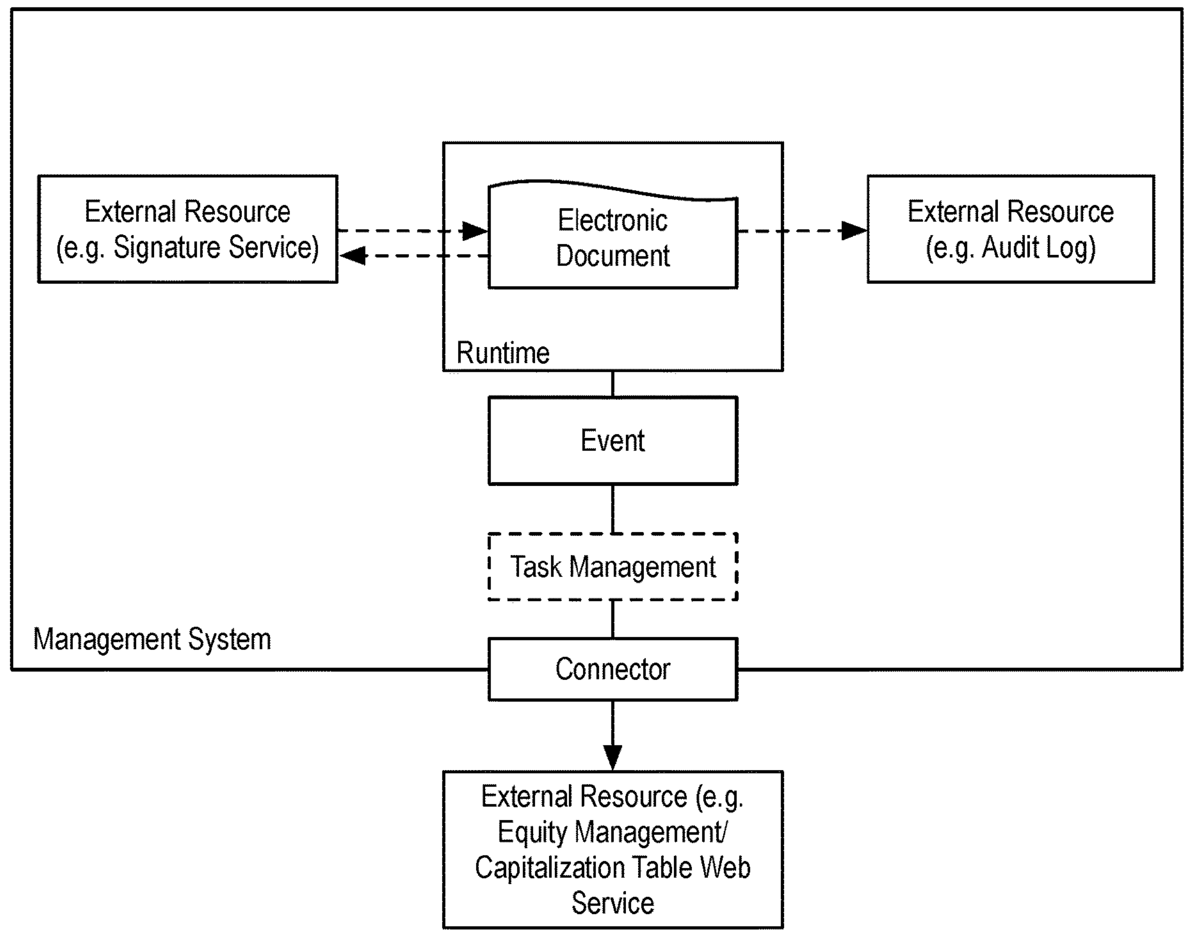
FIG. 13 is a schematic overview of management system components interfaced with an external resource.
Figure 14:
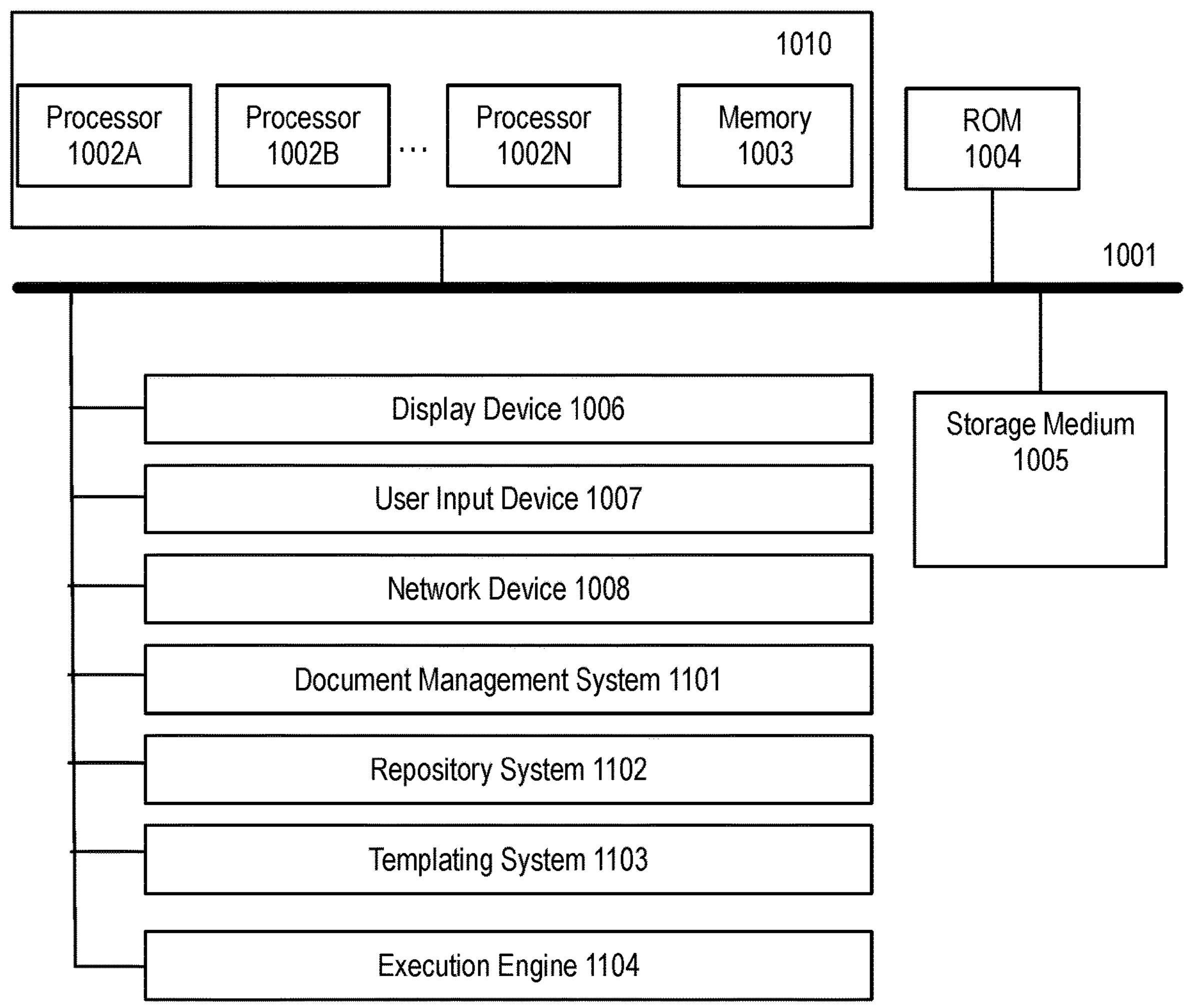
FIG. 14 is an exemplary system architecture that may be used in implementing the system and/or method.

In some variations, inbound and outbound interaction schema responses may include participation of a task management component, wherein the task management component may be used to configure user intervention, operation, or action in an interaction schema such as manual confirmation of triggering a payment on an external resource. In a sixth example, as shown in FIG. 13, in response to an inbound interaction schema from the e-signature, a programmable element may generate a state object and a contract event (e.g. a payment obligation). The payment, on an external system, may be approved as a task at the task management component. The payment transaction is performed through a payment gateway API by transforming a payment obligation object via a connector.

Block S214, which includes updating the state of the executable document object, functions to set the state of the document object. Updating the state of the executable document object S214 preferably occurs in conjunction with block S212. That is, the state of the document object may be updated whenever a programmable element is executed. Alternatively, updating the state of the executable document object S214 may be independent of initiating at least one programmable element, or may alternatively lead to initiating a programmable element. State may be configured in any appropriate manner for retention.

The method may include, in response to triggering an outbound interaction schema trigger: activating the executable logic of the outbound interaction schema S220, and modifying the associated external resource(s) S222. The outbound interaction schema response functions as an action on an external resource via the outbound interaction schema. Outbound interaction schema trigger types may generally be any trigger type. In some variations, inbound interaction schema trigger types are action trigger types in response to distinct state changes of the document object (e.g. execution of the document object, document object state update).

Block S220, which includes activating the executable logic of the outbound interaction schema, functions in activating an outbound workflow from the document object to an external resource in response to the trigger.

Block S222, which includes modifying the associated external resource, functions to perform an action on the external resource, or through the external resource. For example, an outbound interaction schema to an instant message account (e.g. Slack), in response to a warning call from a weather interaction document object, may use the Slack account to send a weather warning to all subscribed members to the account. A distinct outbound interaction schema to a blockchain system from the weather interaction document object may lead to modifying the blockchain state by storing the new state of the weather interaction document object and/or triggering a transaction through a call to a blockchain "smart contract".

In a general contract example for a contract document object, detected confirmation of signing of a contract can be used initiating various operations managed through the executable contract. For example, upon execution of a contract document object between two people: an outbound interaction schema, to a payment processor, may lead to a payment processed from one user account to the other user account. The processed payment may in turn trigger a payment confirmation event, leading to an inbound interaction schema, executing a 'contract complete' programmable element. Updating the state of the contract document to 'completion' may in turn trigger an outbound action(s) to private APIs for the contracting parties. These outbound actions may then provide confirmation messages to the users and provide other functionalities on the private APIs (e.g. copy the contract document history on a local server on the private API).

3. System

Figure 9:
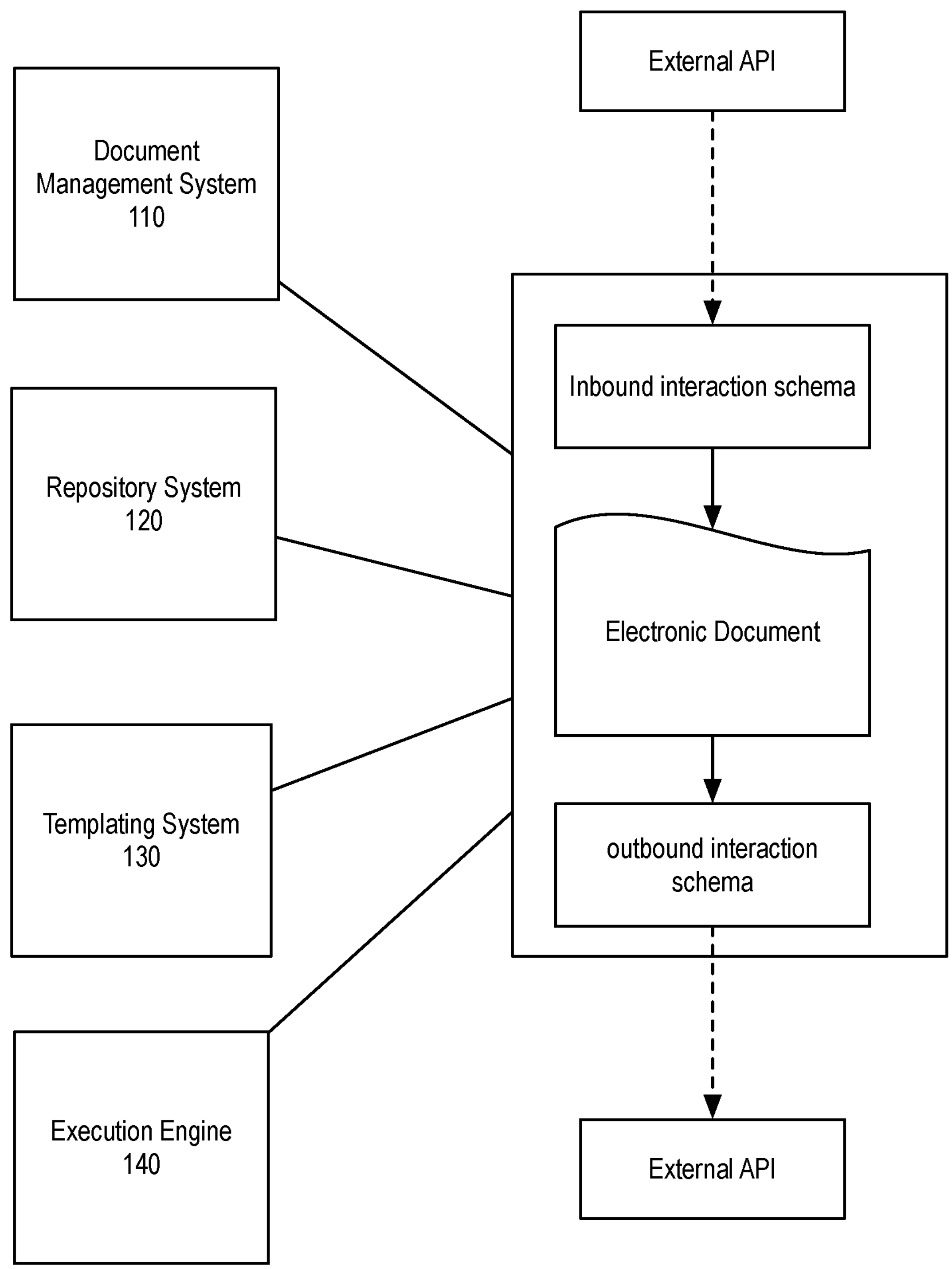
FIG. 9 is a schematic representation of a system of a preferred embodiment.

As shown in FIG. 9, a system for management of digital dynamic documents comprising: a document management system 110, used for creating, editing, and managing electronic documents; a repository system 120, used for storing electronic documents and associated components; a templating system 130, used for creating, adding, removing, and modifying templates, and an execution engine 140. Additional and/or alternative components may be used in variations. The system may function to enable formation, execution, and configuration of electronic documents, including specification of programmable elements, i.e. addition, removal, and modification of the programmable elements. Furthermore, the system may enable and define interaction with external resources; through creation, association, and packaging of interaction schemas with the electronic document (i.e. document package), wherein these interaction schemas control interaction between the electronic document and external APIs.

The system may be implemented in any general manner for electronic document management and execution, but may be particularly useful for implementation of the method as described above. In some variations, the system may be implemented as a local platform for a single user, or local network user implementation. In another variation, the system may be implemented as a service wherein users may access the system remotely (e.g. cloud service).

In some variations, the system may be implemented for specialized electronic documents. The system for specialized documents may include additional components, additional functionalities further, and/or additional optimizations in accordance with the type of specialized electronic document. For example, a system specialized for contract electronic documents may further include components that enable user interaction, negotiation, and optimizations regarding purchases and sales. Other examples may include systems specialized for: policy documents, purchase orders, letters of credit/credit documents, statements, planning documents, financial records, and spreadsheets. Dependent on implementation, system components, functionalities, and optimizations may be added, removed, or added, as desired.

An electronic document may take any suitable form or structure as desired. In many variations, the electronic document may comprise, at least partially, of machine-readable/computable components, i.e. programmable components. Additionally, the electronic document may comprise, at least partially, of language-based natural language (NL) components. The electronic document may have any general structure. In some variations, the electronic document may have class-like structures with clauses. Document clauses may be composed of machine-readable programmable clauses and NL clauses. Clause logic may be written in an expression language with limited expressiveness, or any degree of expressiveness, allowing conditional and bounded iterations.

In some variations, the electronic document and its representations (e.g. template documents) may be bundled with interaction schemas (i.e. a document package). The document package comprises the electronic document and any number of inbound interaction schemas and/or outbound interaction schemas, wherein each interaction schema defines and controls interaction between the electronic document and an external API.

The system of a preferred embodiment includes a document management system 110. The document management system 110 may include a document editor, a template library, and a user dashboard. The document management system 110 functions to enable users to edit, form, manage, and analyze electronic documents. In contract specialized variations the document management system 110 may further enable user interactions (e.g. negotiation, decision making, contract signing).

Figure 10:
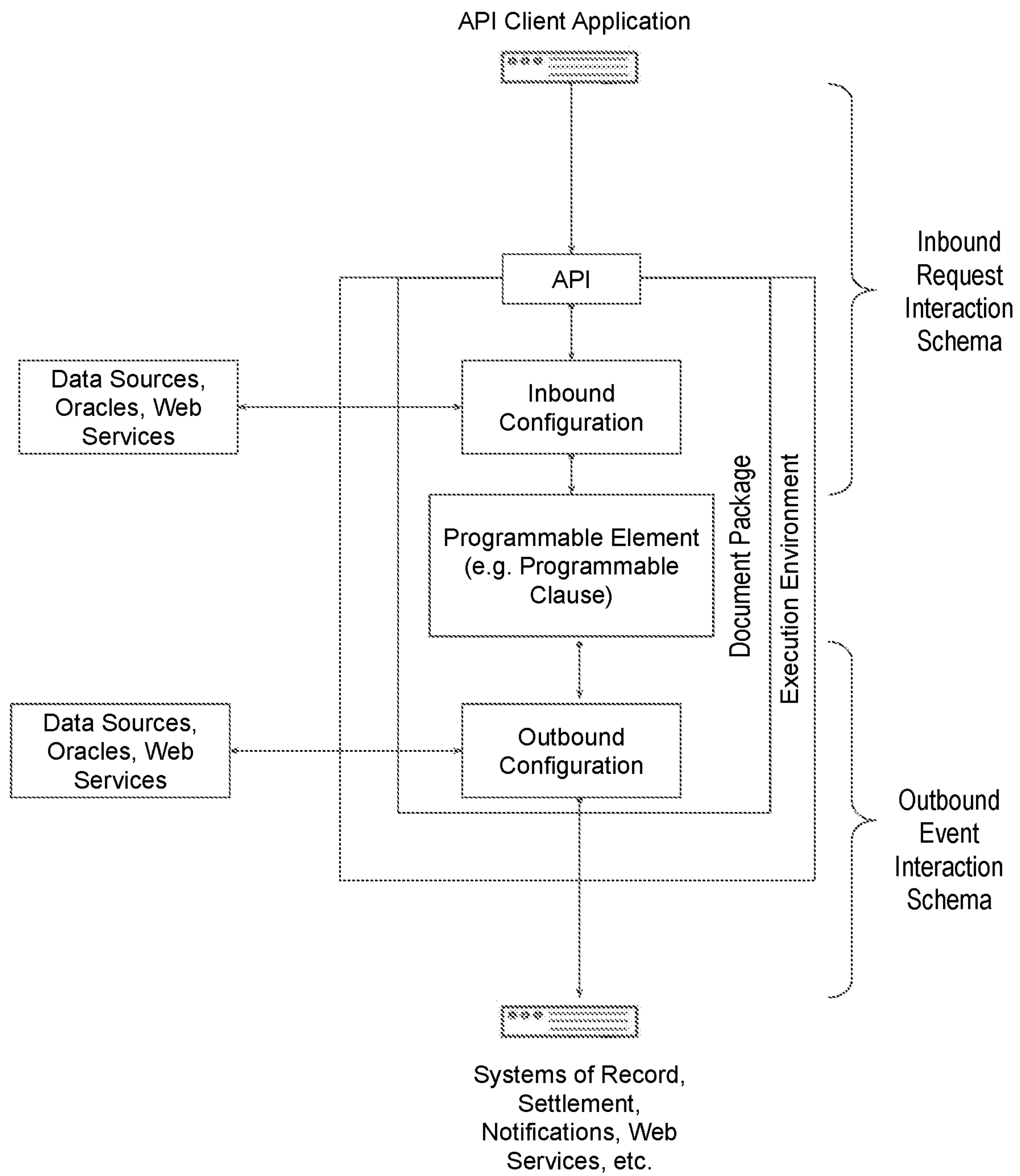
FIG. 10 is one schematic representation of system interaction.

Additionally, in many variations, the document management system 110 may be used to define and configure external API interactions. Through the document management system 110, a user may add, remove, edit, or manage interaction schemas between the electronic document and external APIs. As shown in FIG. 10, the document management system 110 may additionally enable packaging of inbound interaction schemas and outbound interaction schemas with the electronic document, creating document packages.

The document management system 110 may include a template library. The template library functions as a relevant library of templates for user implementation. Libraries may be scoped for user accounts. A user account may have multiple libraries. Libraries may contain document templates and/or interaction schema templates. That is, the template library organizes templates by associations, enabling quick accesses to potentially relevant templates for a user. Templates may have user-defined 'tags', keywords or similar to enable users to search, label, and configure templates. In some variations, the template library enables the use of search terms to find a desired template. Additionally, once a document template has been chosen, the template library may present commonly associated interaction schema templates that can be used and/or are typically used with the document template.

In some variations, the template library may implement association and/or learning models to track which interaction schemas (or interaction schema templates) are used with a particular executable document (or document template). In these variations, the template library may leverage this information to provide an updated list of 'typically used' interaction schemas.

The document management system 110 may include a document editor. The document editor functions to enable editing of electronic documents and associated subcomponents. The document editor may provide a GUI for user interaction. The document editor may enable importing saved documents for editing, or importing document templates for creating new documents. The document editor may enable the addition of components through manual text editing of documents, and/or importing components. An editor may provide additional functionality that may be beneficial for certain document types such as commenting, collaborative editing, and 'redlining'.

Components may be imported directly from the repository (e.g. a distinct programmable component function), imported from other executable documents, or imported as part of a template from the template library. In some variations, once programmable components and/or natural language components are imported (either directly or through a template), a text representation of the component may be generated (e.g. code for programmable components and human-readable text for natural language components). These text representations may be directly edited in the document editor as desired. In some variations, context-based windows may additionally, or alternatively, be used to edit imported programmable components and/or natural language elements.

The document editor may additionally enable adding, editing, configuring, and/or removing interaction schemas from the document. Interaction schemas may be edited as distinct objects that are then linked to the electronic document. Alternatively, interaction schemas may be stored within the electronic document. Interaction schemas may be added from an interaction schema template, wherein a text-based code representation of the interaction schema logic may be generated. Code representations may be directly edited in the document editor as desired. In some variations, context-based windows may additionally, or alternatively, be used to define and/or select variations/instantiations of the interaction schema. In other variations, a document editor may form a component of an integrated development environment (IDE) for developing electronic documents including interaction schemas. In one implementation, an expression language may be used to define the logic of the interaction schema between steps. For example, JSONata to transform JSON generated by an object and transformed to an action on an API. FIG. 3 shows one implementation through a user interface for a trigger, using a JSONata transform, HTTP request.

The dashboard may function as an interface that provides document information to the user. Additionally, the dashboard may provide tools for analysis of the electronic document and/or document package. The dashboard may be a configurable interface. As desired, the dashboard may provide relevant information (e.g. as configured by the user) to the user in some desired interval (e.g. periodic updates, threshold updates, document state change updates).

In some variations, the dashboard may further enable users to perform analytics on electronic documents. Through the dashboard, individual electronic documents, and/or groups of electronic documents may be analyzed for general statistical information (e.g. average, mean, mode), trend analysis (e.g. linear regression, power laws), and data modeling as well as predictive, prescriptive, and descriptive analytics.

The repository system 120 of a preferred embodiment functions to store electronic documents and document related data. Document related data may include all of the data pertaining to an electronic document. Document related data may include (but is not limited to) the document templates, wherein the document templates comprise template text and/or template logic and any associated interaction schemas.

The repository system 120 may comprise any type of database, cloud-storage, private storage device (e.g. local hard drive), which may be either locally or remotely hosted. The repository system 120 is preferably accessible from the document management system 110. The repository system 120 may be a multi-tenant cloud-based system, a locally hosted system, on or as part of a peer-to-peer network (e.g. utilizing a distributed file system such as InterPlanetary File System), or take the form of any suitable data storage system. In one implementation, a distributed version control system (e.g. git) is used as a component of the repository system 120.

The templating system 130 of a preferred embodiment functions to bind natural language text to executable programmable logic in a reusable manner. The templating system 130 may take any suitable form. In one variation, the templating system 130 may comprise three components: a template grammar, a template model, and the template logic. Alternative components and structures may be used in variations.

The template may consist of natural language text that identifies data-oriented variables (e.g. price, date, etc.).

The template model may provide a framework for categorizing the variables and the components of the business context that "activate" the electronic document. In some variations, the template model can mirror or otherwise map to an object model (e.g. an object model of a blockchain network). In alternative variations, the template model may be used with text and logic bound together using a mark-up language, a language-independent format (e.g. JSON), and/or in a formal representation (e.g. a programming language).

Figure 11:
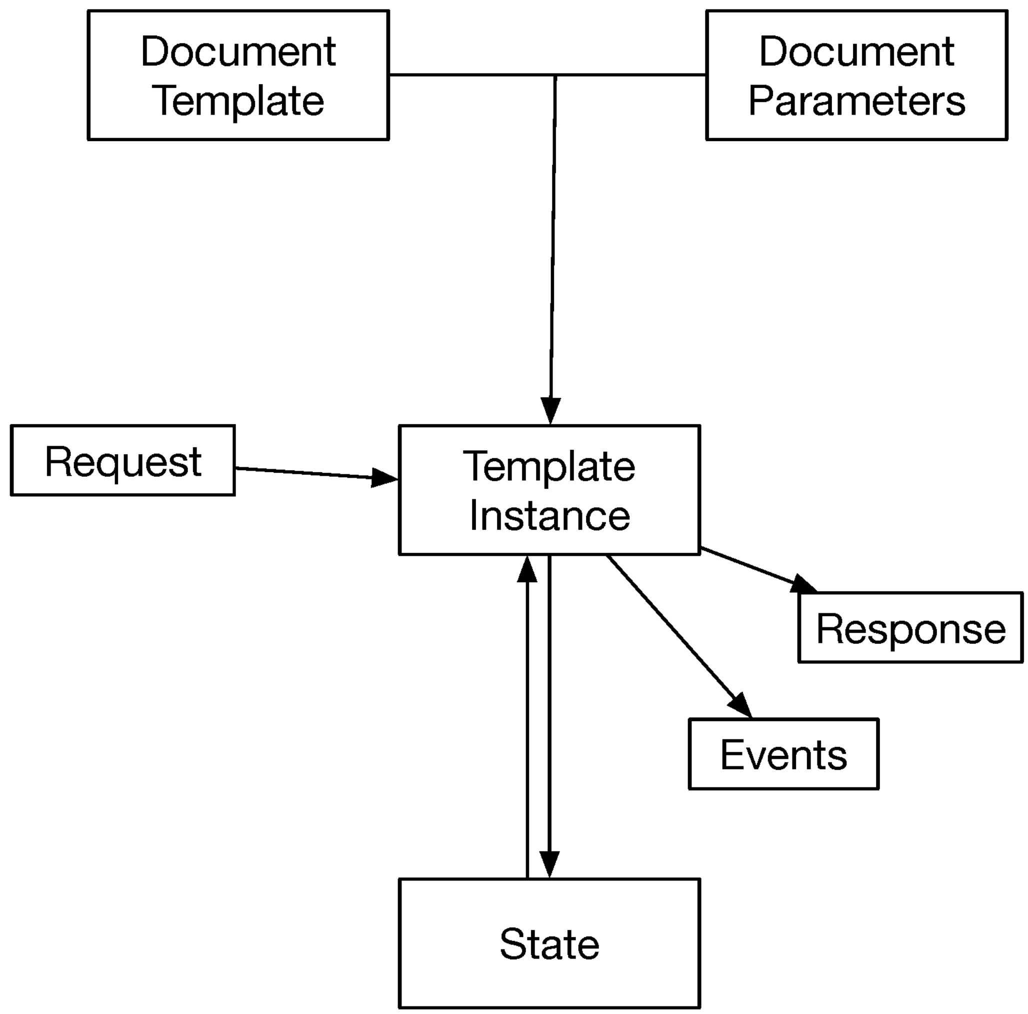
FIG. 11 is a schematic representation of an embodiment that includes the templating system.
Figure 12:
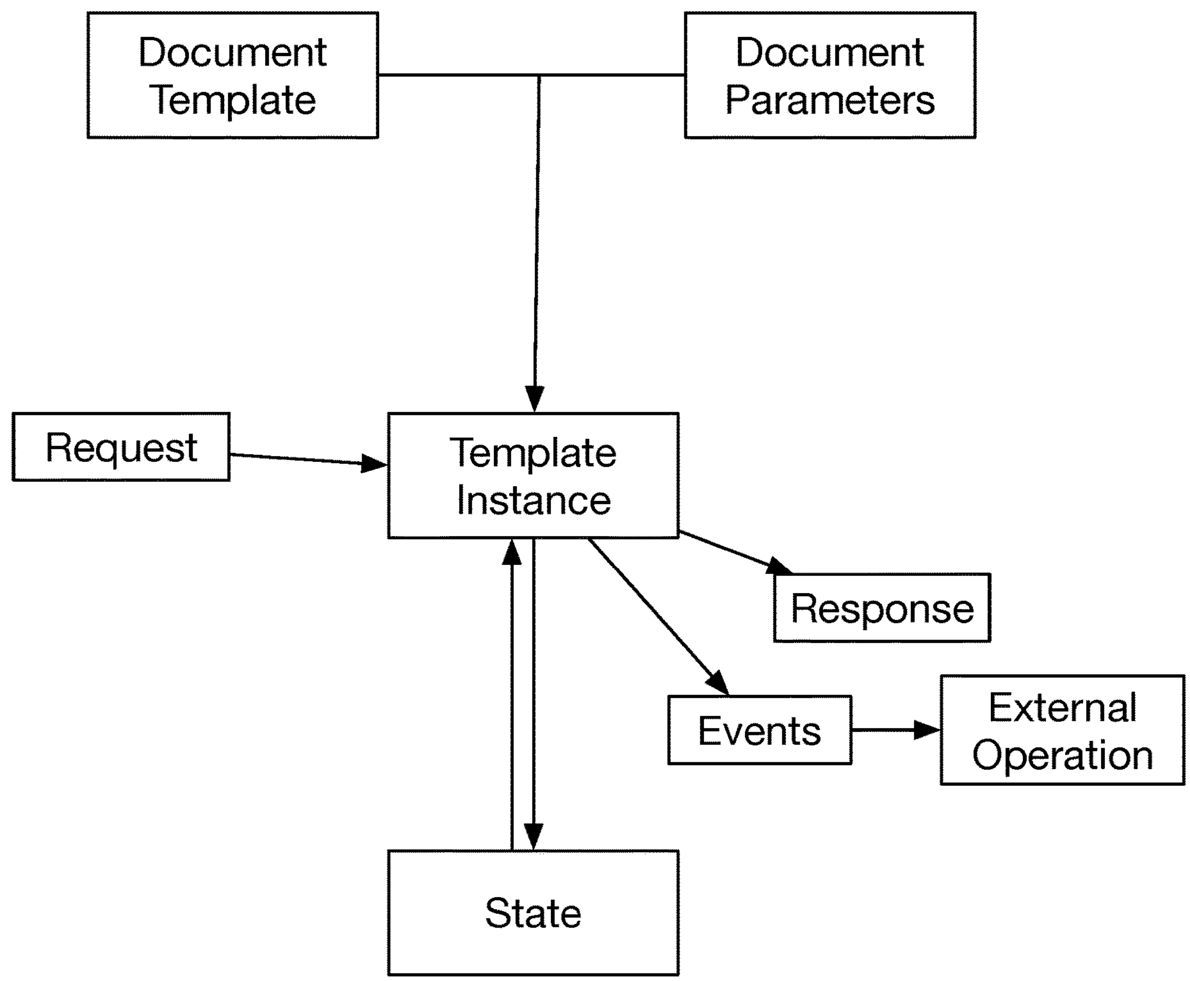
FIG. 12 is a schematic representation of a second embodiment that includes the templating system.

The template model may then be embedded within, or linked to the electronic document. A programmable element within a document may be executed by exposing data to the programmable element (e.g. events from external resources such as freight being shipped, delivered, signed-for etc.). These events may be routed to the template so that the template can take appropriate action. In one implementation, events may be structured as a request-response model. FIG. 11 depicts one variation of the template model, along with request and response types. In this variation of the template model, a template request transaction defines the data that the template needs to receive from external sources. The template response transaction may define the data that the template will return when it receives a template request. FIG. 12 depicts an alternate variation alongside the request and response. In this variation, the event may lead to an additional response or external operation. In one example, the external operation may be an event confirmation (e.g. performed by a task management system). In an electronic contract implementation, once an event has occurred, the task management system may send/seek confirmation from the contract participants to perform an operation such as triggering steps configured in an interaction schema without that occurring through execution of the interaction schema without user intervention.

In some variations, the system may further include a task management component. A task management subsystem/component may also form part of a management system. The task management component preferably exposes contract events and external actions to the user through the management system. In a preferred embodiment, the task management component aggregates and collates events scoped by document for display to the end user. In electronic contract implementations, these events may be pulled directly from the same source as the audit log. The task management component may expose data to a user of the system and method as a dashboard or series of dashboards. In some variations, a multiplicity of data visualization tools may be used to provide analytics and other data to users on the status of tasks. For example, data exposed in contract event objects may be used to show changes to the status of contract obligations over time, time elapsed since obligations became effective, overdue obligations, obligations that need performing on an external resource, and/or other exemplary changes to the status.

The task management component preferably enables users to interact with contract events and other forms of contract action. For example, a configured action such as a payment may be 'queued' as a task requiring user initiation (e.g. a signatory to a contract or a user within the signatory's organization scope), such as approval, before outbound interaction schema steps are triggered to execute a payment transaction on an external resource such as a payment gateway. This enables the state of a contract to be computed, including contract operations on external systems, without triggering execution on the external system directly from a programmable component. Exceptions (e.g. configured parameters such as payment values) may be defined to automatically approve/execute suitably configured operations. Conditionals of any arbitrary complexity may be supported.

The execution engine 140, of a preferred embodiment, functions to execute programmable logic of electronic documents. The execution engine 140 preferably acts upon incoming requests to the logic of a document template instance, executing the functions of the logic, emitting a response, updating the document state, and emitting any other objects or events as defined by the logic and/or interaction schema.

The execution engine 140 may handle a variety of input types. Examples of input types include: data input accessed over a programmatic interface (e.g., a REST API, GraphQL API, SOAP API, etc.), simple mathematical transformations of the data from those APIs, event notifications, data from various blockchain/distributed ledgers, data from the execution of programmable components of the electronic document, off-chain or on-chain, and/or other various sources.

The execution engine 140 may be designed to be embeddable across a wide-variety of form factors: web, middleware, SaaS (Software as a Service), on a blockchain or distributed ledger, or any other suitable runtime environment. The execution engine 140 may take any suitable form of computing/runtime environment for executing programmable elements within documents. The execution engine 140 may be run in a shared execution environment such as public, dedicated, or private cloud environment, on a shared server, on a peer-to-peer network, or other appropriate execution environment. In one variation, the execution engine 140 may take the form of an interpreter, virtual machine (VM) or may form part of one. A virtual machine may be web-based, cloud-based, run on a cluster, or in any other suitable environment. In some variations, the execution engine 140 may be used within, or on, a blockchain or distributed ledger system. Alternatively, an execution engine 140 may be embedded within a node on a blockchain or distributed ledger system. A node on a blockchain system is a device on a blockchain or distributed ledger network, which preferably serves to process an individual copy of the blockchain or ledger. For a contract electronic document, the nodes of the blockchain or distributed ledger system may maintain the document state globally, across participants, and facilitate computation of state consensus.

The results of logic execution (e.g. the execution of a JSON serialized object) may include, but are not limited to: outputting/logging details of the programmable component that was executed (name, version, SHA256 hash of element data); generation of an incoming request object; and generation of an output response object. In some variations, the document state may be maintained at the document level by optionally attaching a document to a state object, giving the logic of the document read and write access to the document state. Additional and/or alternative data, objects, and metadata may be included. Alternatively, document state may be maintained at the element level (e.g. by the programmable component).

Execution of the programmable component may also emit event objects in addition to response object(s). Event objects may be emitted to an external storage system (e.g. a blockchain), stored on a document state system, or otherwise used as an appropriate medium for the persistence component. For example, a programmable component within a contract electronic document may emit an obligation object, which can be mapped to external resource script function calls (e.g. to transition the state of a distributed ledger or blockchain network or other resource such as an application).

The execution engine 140 may further comprise a compiler. The compiler functions to generate code from the document programmable logic for execution. The programmable logic may be in any suitable language, including a domain specific language such as for contracts (e.g. a programming or markup language). Prior to execution, the compiler may generate code for execution from the template, using the document programmable logic. The document programmable logic may be in any suitable language. The generated code for execution may be for any desired suitable platform. The compiler may also cross-compile to generate executable code for any other platform (e.g., a given BDL system, virtual machine, a microcontroller of a resource constrained device such as an IoT device, etc.). In some variations, the logic of the programmable element may be compiled down to, or otherwise, delegated to an alternative runtime for execution. For example, the compiler in the system and method may generate binary code/bytecode for a blockchain, distributed ledger, and/or an electronic contract system.

The compiler may take any suitable form. Alternatively, any suitable alternative architecture with similar functionality may be used instead of the compiler. In one variation, the compiler may include: a parser, wherein the parser parses contract logic from a syntax tree to an executable syntax tree; a type checker, that checks the validity of the programmable component logic against the template model logic and checks the validity of the document against the template grammar and typing rules; a translation from the contract logic syntax tree to calculus (i.e., optimizer), that "desugars" syntactic sugar to improve code-generation from a simpler calculus; and a code-generator from calculus to a target language. The compiler may further include target-specific runtime libraries (e.g. JavaScript operation to create a new electronic document). In addition, user-level standard libraries, for core operations (e.g. math libraries) may also be included.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

In one variation, a system comprising of one or more non-transitory computer-readable mediums storing instructions that, when executed by the one or more computer processors, cause a computing platform to perform operations comprising those of the system or method described herein such as: creating an executable document object; constructing an interaction schema object; and bundling the interaction schema with the executable document object, and optionally performing actions in response to triggering an inbound interaction schema trigger ad/or optionally performing actions in response to triggering an outbound interaction schema trigger.

FIG. 12 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented on the same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting document management system 1101, repository system 1102, templating system 1103, execution engine 1104, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A method for executable electronic contract management comprising:

creating an executable electronic document, the creating comprising:

generating programmable clauses comprising programmable logic; and establishing a state for each programmable clause by setting values for one or more variables of each programmable clause;

constructing one or more logic flows between an external resource and the executable electronic document, wherein each logic flow comprises executable logic and a trigger, and wherein constructing the one or more logic flows comprises:

setting an inbound trigger for an inbound logic flow, the inbound trigger comprising an event at an external resource, wherein triggering the inbound logic flow causes a transfer of data from the external resource to the executable electronic document; and responsive to triggering the inbound logic flow trigger, updating at least one value of the one or more variables of a programmable clause.

2. The method of claim 1, wherein generating the programmable clauses comprises importing programmable clauses from another executable electronic contract.

3. The method of claim 1, wherein updating the at least one value of the one or more variables of the programmable clause causes a change in state of the programmable clause and a change in state of the executable electronic contract.

4. The method of claim 1, wherein constructing the one or more logic flows further comprises:

setting an outbound trigger for each outbound logic flow, the outbound trigger comprising a contract event, wherein triggering an outbound logic flow of the one or more outbound logic flows causes a transfer of data from the executable contract document to the external resource.

5. The method of claim 4, wherein the transferred data is based on the contract event, and wherein triggering an outbound logic flow further comprises:

causing the external resource to perform an action, the action based on the transferred data.

6. The method of claim 1, wherein constructing the one or more logic flows further comprises determining, based on the external resource, a logic flow template from a set of logic flow templates.

7. The method of claim 1, wherein constructing the one or more logic flows further comprises associating a user profile comprising a set of necessary credentials with the one or more logic flows.

8. The method of claim 7, wherein the executable logic of the one or more logic flows comprises:

retrieving, from the user profile associated with the one or more logic flows, the necessary credentials; and providing the necessary credentials to the external resource to access the external resource.

9. A non-transitory computer-readable medium storing instructions that, when executed by one or more computer processors, cause a computing platform to perform operations comprising:

creating an executable electronic document, the creating comprising:

generating programmable clauses comprising programmable logic; and establishing a state for each programmable clause by setting values for one or more variables of each programmable clause;

constructing one or more logic flows between an external resource and the executable electronic document, wherein each logic flow comprises executable logic and a trigger, and wherein constructing the one or more logic flows comprises:

setting an inbound trigger for an inbound logic flow, the inbound trigger comprising an event at an external resource, wherein triggering the inbound logic flow causes a transfer of data from the external resource to the executable electronic document; and responsive to triggering the inbound logic flow trigger, updating at least one value of the one or more variables of a programmable clause.

10. The non-transitory computer-readable medium of claim 9, wherein generating programmable clauses importing programmable clauses from another executable electronic contract.

11. The non-transitory computer-readable medium of claim 9, wherein updating the at least one value of the one or more variables of the programmable clause causes a change in state of the programmable clause and a change in state of the executable electronic document.

12. The non-transitory computer-readable medium of claim 9, wherein constructing the one or more logic flows further comprises:

setting an outbound trigger for each outbound logic flow, the outbound trigger comprising a contract event, wherein triggering an outbound logic flow of the one or more outbound logic flows causes a transfer of data from the executable document to the external resource.

13. The non-transitory computer-readable medium of claim 12, wherein the transferred data is based on the contract event, and wherein triggering the outbound logic flow further comprises:

causing the external resource to perform an action, the action based on the transferred data.

14. The non-transitory computer-readable medium of claim 9, wherein constructing the one or more logic flows further comprises determining, based on the external resource, a logic flow template from a set of logic flow templates.

15. The non-transitory computer-readable medium of claim 9, wherein constructing the one or more logic flows further comprises associating a user profile comprising a set of necessary credentials with the one or more logic flows.

16. The non-transitory computer-readable medium of claim 15, wherein the executable logic of the one or more logic flows comprises:

retrieving, from the user profile associated with the one or more logic flows, the necessary credentials; and providing the necessary credentials to the external resource to access the external resource.

17. A system comprising:

memory with instructions encoded thereon; and one or more computer processors that, when executing the instructions, are caused to perform operations comprising:

creating an executable electronic document, the creating comprising:

generating programmable clauses comprising programmable logic; and establishing a state for each programmable clause by setting values for one or more variables of each programmable clause;

constructing one or more logic flows between an external resource and the executable electronic document, wherein each logic flow comprises executable logic and a trigger, and wherein constructing the one or more logic flows comprises:

setting an inbound trigger for an inbound logic flow, the inbound trigger comprising an event at an external resource, wherein triggering the inbound logic flow causes a transfer of data from the external resource to the executable electronic document; and responsive to triggering the inbound logic flow trigger, updating at least one value of the one or more variables of a programmable clause.

18. The system of claim 17, wherein generating programmable clauses comprises importing programmable clauses from another executable electronic contract.

19. The system of claim 17, wherein updating the at least one value of the one or more variables of the programmable clause causes a change in state of the programmable clause and a change in state of the executable electronic document.

20. The system of claim 17, wherein constructing the one or more logic flows further comprises:

setting an outbound trigger for each outbound logic flow, the outbound trigger comprising a contract event, wherein triggering an outbound logic flow of the one or more outbound logic flows causes a transfer of data from the executable document to the external resource.

* * * * *